Jan. 7, 1964  H. NICK ETAL  3,117,084
MEANS FOR CONCENTRATING SUSPENSIONS
Filed May 5, 1959
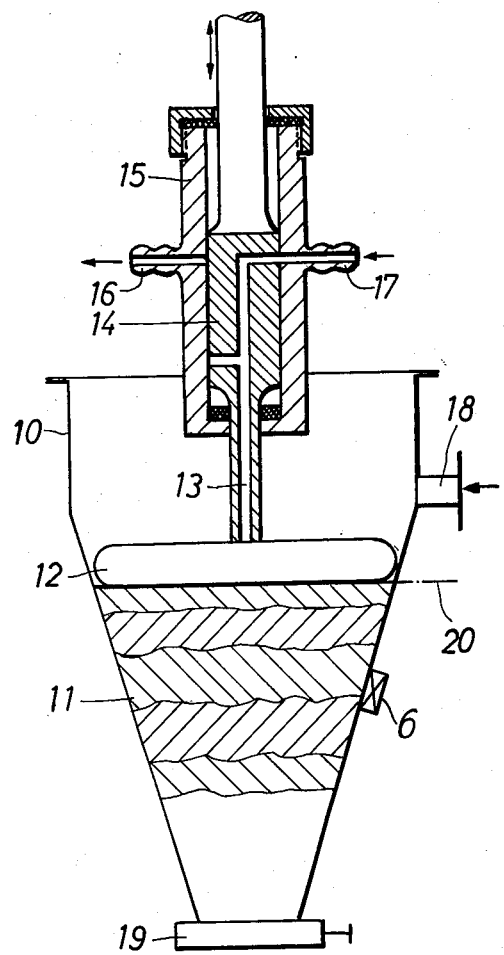
INVENTORS:
HANS NICK, WOLFGANG BENDER.
BY
Burgess, Dinklage & Sprung
ATTORNEY

United States Patent Office 3,117,084
Patented Jan. 7, 1964

3,117,084
MEANS FOR CONCENTRATING SUSPENSIONS
Hans Nick, Cologne-Dellbruck, and Wolfgang Bender, Cologne-Mulheim, Germany, assignors to Farbenfabriken Bayer Aktiengesellschaft, Leverkusen, Germany, a corporation of Germany
Filed May 5, 1959, Ser. No. 811,096
Claims priority, application Germany May 10, 1958
4 Claims. (Cl. 210—241)

The present invention relates to means for concentrating suspensions.

In the chemical industry it is frequently necessary to concentrate suspensions with a low solid content in order that subsequent filtration or centrifuging of the suspensions may be carried out in substantially smaller apparatus such as, for example, in a thrust-type centrifuge. The known static concentrators occupy a considerable amount of space, especially those designated to deal with suspensions in which the solid particles have a low rate of settling. Continuously operating concentrators, such as hydrocyclones, centrifuges having solid casings and plate-type centrifuges with nozzle-type drums, in which the rate of settling of the solid particles in the centrifugal zone is increased do not result in a sufficiently clear filtrate or in an adequate concentration of the suspension.

Means for dehydrating and shaping fibre pulp suspensions are known in which the suspensions are disposed between two horizontal sieves or the like which are movable relative to each other on press plungers and which are guided with a tight closing action into a vessel containing the suspension. Such means require an impracticable high power consumption in relation to the concentration which is effected.

Filtering arrangements are also known which consist of a vessel charged with the suspension and which have a filter element in the upper part thereof which can be connected alternately to spaces of different pressure, while an outlet for concentrated material is provided in the bottom of the vessel. The cake forming on the filter element in these arrangements during the filtering of the suspension is blown off after a certain time, sinks down in the lower conical portion of the vessel and can be continuously removed therefrom by means of a worm (for example shell-type concentrators).

The main object of the invention is to provide a simple, highly efficient, and inexpensive filter device avoiding the disadvantages of the art.

In the drawing, FIG. 1 is a sectional elevation of the filter in accordance with the invention.

Although it is known that an improved filter output can be produced by causing the pressure in front of the filtering surface to fluctuate during the filtration, difficulties nevertheless arise, because the expelled filter cake is not deposited uniformly on the bottom of the vessel, but settles on the walls of the latter and finally the unconcentrated suspension flows directly downwards to the worm. Another disadvantage consists in that parts of expelled cake are again partially filtered.

It has now been found that these disadvantages can be obviated, if, in accordance with the invention, the horizontally arranged filter element 12, which has a filtrate side connected, as is shortly to be described, with the pipe 13, and a suspension side exposed to the suspension in the vessel 11, and is disposed in the cylindrical upper part 10 of the vessel is vertically movable by means of a piston-like devices 14, 15. By this means, with a simple construction requiring a relatively small amount of space, a highly concentrated sludge is produced which can be continuously withdrawn without the aforementioned disadvantages. The filter element 12 is adapted to be connected, at suitable vertical positions of the piston, to a vacuum pipe 16 or to a pressure pipe 17 through a pipe 13, passages in the piston 14 and apertures in the cylinder 15. The bottom part of the container is equipped with a vibrator 6 in order to consolidate loose layers of filter cake in the bottom part of the container. We are aware that it is already known to apply acoustic irradiation to a liquid for accelerating filtration, using the filter element itself. In contrast thereto, in the present device only the cakes which have already been expelled are to be formed in superimposed layers on the bottom of the container by means of a vibrator and consolidated in order to be removed by means of the bottom discharge device without being mixed with the suspension.

A horizontally disposed filter element 12 covered with fabric is arranged in the cylindrical upper part 10 of the vessel 11 as shown in FIG. 1, in order to permit the continuous withdrawal of products which do not flow out in spite of powerful vibration. The filter element is connected through a pipe line 13 to a control piston 14, which can move vertically in the control cylinder 15. The pipe line 13 may be connected through a rotating slide valve or control head alternately to a vacuum pump (not shown) or to a compressed air pump (not shown). In the upper dead centre position, the filter element is connected through the conduit 16 and by way of a separator to a vacuum pump (not shown), and in the lower dead centre position, by the conduit 17 to a compressed air pump (not shown). The suspension is supplied into the vessel 11 through the inlet pipe 18. The vessel 11 is initially filled with suspension until the whole filter element is covered. With the subsequent filtration process, a cake is partially filtered off. For forcing out the cake, the filter element is lowered into the conical part of the vessel as shown in FIG. 1; a short pressure impulse results in the detachment of the cake and in the simultaneous cleaning of the filter cloth. After the filter cake has been filtered and detached several times and possibly consolidated by means of the vibrator 6, the conical part is filled with a corresponding quantity of filter cake, so that as the operation continues, this cake is consolidated in the conical outlet and is forced out through the shutter member 19 or the like as, for example, a conveyor worm, which is now opened accordingly. The reference numeral 20 indicates the boundary line between sludge on the one hand and suspension on the other hand.

As regards the solid content of the thickened suspension which can be produced, the apparatus can be graded between a filter and static concentrator.

We claim:
1. A filter for concentrating suspensions comprising a vessel for receiving liquid to be filtered, inlet means for introducing a suspension to be filtered into said vessel, outlet means for removal of concentrated solids from the lower portion of the vessel, a filter element in the vessel, said filter element having a suspension side and a filtrate side, the suspension side being exposed to the suspension, a rigid tube having a passageway therein for passage of fluid therethrough and having one end thereof fixedly connected to said filter element and in fluid connection with the filtrate side of the filter element and a portion of the other end thereof slidably received in a cylinder, said rigid tube being reciprocatable in said cylinder whereby the filter element is moved in a reciprocating motion, conduit means through said cylinder for connection to a source of positive pressure and a source of positive pressure connected thereto, and conduit means through said cylinder for connection to a source of negative pressure and a source of negative pressure connected thereto, and conduit means in said tube for communicating said passageway in said tube respectively with the cylinder positive pressure conduit means and the cylinder negative pressure conduit means according to the position of the tube in said cylinder during the reciprocation thereof whereby the filtrate side of the filter element can be connected to a source of negative pressure to cause filtration of the suspension and upon reciprocation of the rigid tube, to a source of positive pressure to dislodge filter cake from the filter.

2. A filter according to claim 1, said vessel being an upright vessel, said filter element being arranged for movement between an upper position and a lower position upon said reciprocation thereof, the filtrate side of the filter element being communicated with said source of negative pressure as aforesaid with the filter element in the upper position, and being connected with said source of positive pressure as aforesaid in the lower position, the said vessel inlet means being connected above the lower position of the filtrate element whereby resuspension of filter cake dislodged upon reciprocation of the filter element and communicating it with the source of positive pressure is avoided.

3. A filter according to claim 2, the vessel having an upper cylindrical portion and a lower conical portion, said filter element having its longitudinal axis disposed horizontally and, in its upper position, being disposed in the vessel cylindrical portion, and in its lower position, being disposed in the conical portion of the vessel.

4. A filter for concentrating suspensions according to claim 1, including means mounted on said lower portion adapted to impart vibratory forces to said vessel along its lower portion and to the contents thereof.

References Cited in the file of this patent

UNITED STATES PATENTS

| | | |
|---|---|---|
| 1,766,166 | Callow | June 24, 1930 |
| 1,971,090 | Zwicky et al. | Aug. 21, 1934 |
| 1,991,644 | Wolters | Feb. 19, 1935 |
| 2,246,497 | Beck | June 24, 1941 |
| 2,887,228 | Harlan et al. | May 19, 1959 |

FOREIGN PATENTS

| | | |
|---|---|---|
| 467,134 | Great Britain | June 11, 1937 |